United States Patent
Mueller

(10) Patent No.: US 7,324,560 B2
(45) Date of Patent: Jan. 29, 2008

(54) RECOVERING CLOCK AND FRAME INFORMATION FROM DATA STREAM

(75) Inventor: Reinhard Mueller, Unterhaching (DE)

(73) Assignee: Infineon Technologies AG, Munich (DE)

( * ) Notice: Subject to any disclaimer, the term of this patent is extended or adjusted under 35 U.S.C. 154(b) by 988 days.

(21) Appl. No.: 10/603,123

(22) Filed: Jun. 24, 2003

(65) Prior Publication Data
US 2004/0057399 A1    Mar. 25, 2004

(30) Foreign Application Priority Data
Jun. 26, 2002   (DE) .................... 102 28 574

(51) Int. Cl.
*H04L 12/56*   (2006.01)
(52) U.S. Cl. ............ 370/509; 370/419; 375/368
(58) Field of Classification Search ........ 370/503, 370/509, 510, 512, 513, 514, 515, 419, 463, 370/473, 516; 375/141, 272, 293, 365, 368; 360/40; 704/207
See application file for complete search history.

(56) References Cited

U.S. PATENT DOCUMENTS

| | | | |
|---|---|---|---|
| 4,383,322 A * | 5/1983 | Halpern et al. ............. | 375/141 |
| 4,544,962 A * | 10/1985 | Kato et al. ................. | 360/40 |
| 5,671,227 A | 9/1997 | Keller et al. ............... | 370/509 |
| 2007/0150264 A1* | 6/2007 | Tackin et al. ............... | 704/207 |

FOREIGN PATENT DOCUMENTS

| | | |
|---|---|---|
| CA | 2160172 | 10/1995 |
| DE | 44 29 595 C1 | 6/1995 |
| DE | 196 41 112 A1 | 10/1995 |

* cited by examiner

*Primary Examiner*—John Pezzlo
(74) *Attorney, Agent, or Firm*—Fish & Richardson P.C.

(57) ABSTRACT

A method for transmitting a digital data stream includes recovery of data clock information and data frame information from the digital data stream. The method includes providing a digital data stream having successive data stream units. Each data stream unit includes a data frame, a data block having data bits, and a frame synchronization word having frame synchronization bits. Successive frame synchronization words of the successive data stream units are then detected and data clock information is determined from a temporal spacing of the successive frame synchronization words. The data clock information is then output in a manner dependent on a temporal spacing of successive frame synchronization bits.

12 Claims, 3 Drawing Sheets

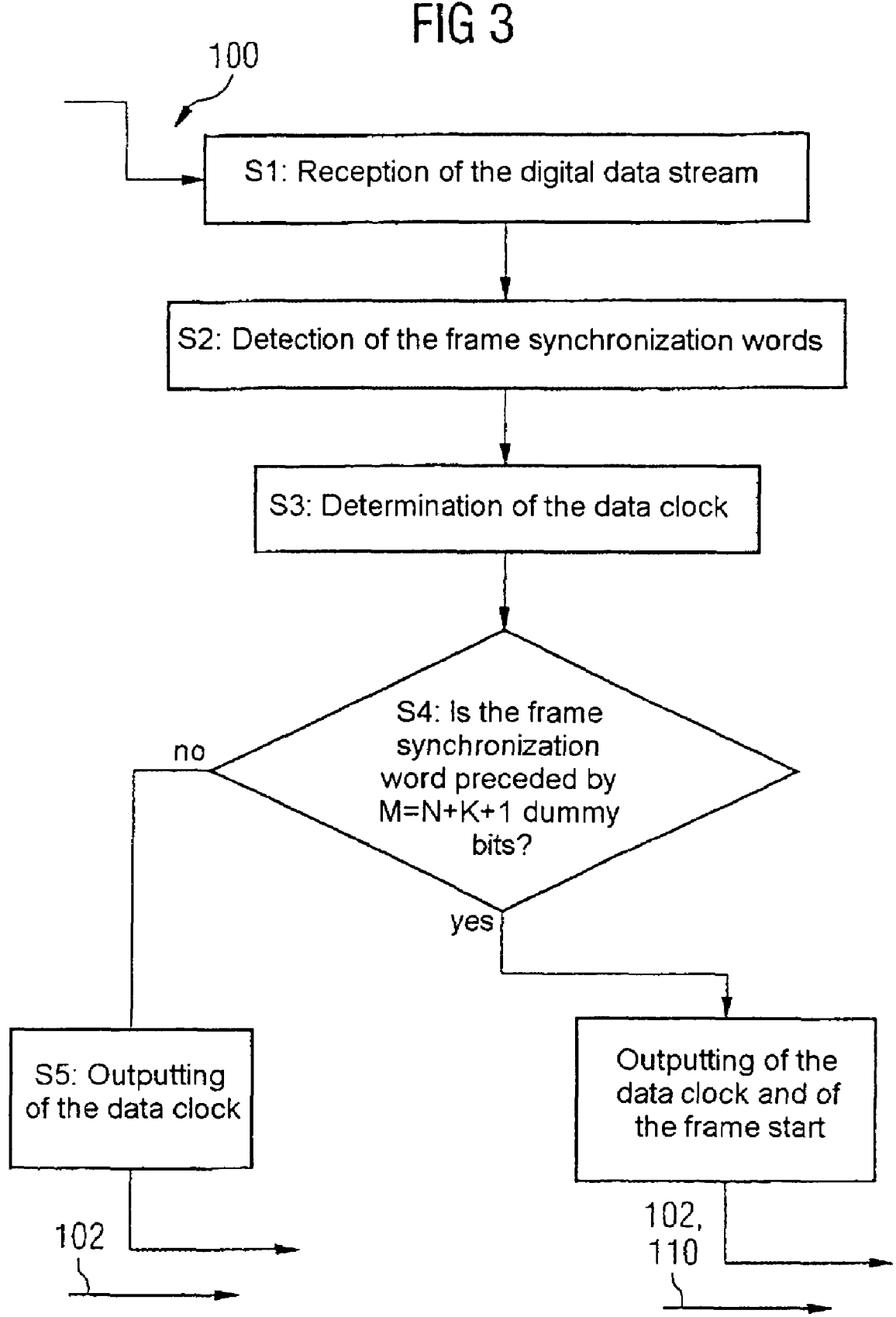

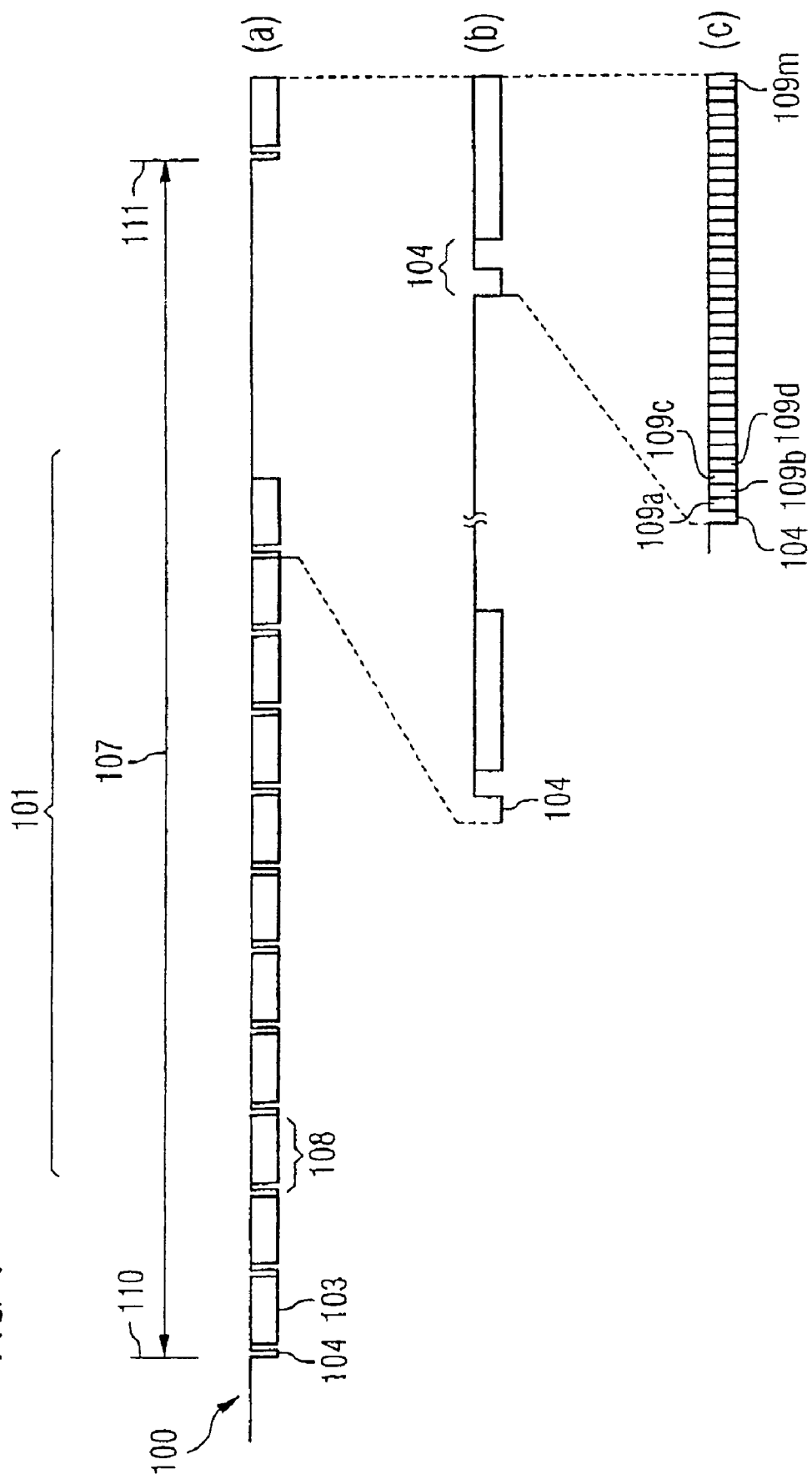

RECOVERING CLOCK AND FRAME INFORMATION FROM DATA STREAM

RELATED APPLICATIONS

This application claims the benefit of the priority date of German application DE 102.28.574.8, filed on Jun. 26, 2002, the contents of which are herein incorporated by reference.

FIELD OF INVENTION

The present invention relates to a method and an apparatus for the exchange of digital data, and relates in particular to a method for the transmission of a digital data stream, in which information about a data clock and about at least one data frame of the digital data stream is recovered from the digital data stream itself.

BACKGROUND

Conventional methods for the transmission of a digital data stream require at least three lines per direction for the data exchange, i.e. a total of at least six lines in order to transmit the data stream including information about a data clock and/or the start of data frames. A high number of lines disadvantageously requires the provision of a corresponding number of connection units or connection pins on a layout of a data stream receiver and/or a data stream transmission unit. For reliable data transmission, it is necessary in accordance with conventional methods also to provide at least one further line for feeding the data clock, in addition to a data input line and a data output line.

The data clock is necessary, for example, to synchronize a PLL, to output a data stream in data stream units or data blocks, and to reliably receive corresponding data streams.

During a transmission of a digital data stream, the data stream is divided into so-called data stream units, comprising at least one synchronization word and a data block with a defined number of data bits. In addition to determining the data clock, it is necessary in many areas of application to determine the start of the data frames and/or the start of data superframes. According to conventional methods for the transmission of a digital data stream, this necessitates further lines and, associated with this, corresponding connection units of a data stream receiver/data stream transmitter. This disadvantageously increases the number of connection units further.

SUMMARY

It is an object of the present invention to provide a method for the transmission of a digital data stream in which the disadvantages of the prior art are avoided, and which is capable, in particular, of providing a transmission of a digital data stream in conjunction with recovery of a data clock and information about individual data frames using only two lines.

An essential concept of the invention consists in integrating information about the data clock and/or about at least one data superframe into the digital data stream to be transmitted. Consequently, it is advantageous if the information about a data clock and at least one data frame can be fed via the same lines, so that a minimal number of lines, i.e. a data input line and a data output line, are necessary.

A further advantage of the invention is that the layout of data stream receivers/data stream transmitters becomes simpler to design by virtue of a smaller number of connection units.

Furthermore, it is advantageous that the method according to the invention is self-synchronizing, i.e. there is no need for an external synchronization by means of, for example, externally predetermined clock or synchronization signals which, under certain circumstances, would have to be fed via separate lines.

The method according to the invention for the transmission of a digital data stream essentially has the following steps:

a) provision of the digital data stream, which comprises at least one data stream unit, the data stream unit encompassing:

a1) at least one frame synchronization word having K frame synchronization bits, and a2) at least one data block having N data bits;

b) reception of the digital data stream in a data stream reception unit;

c) detection of the frame synchronization words of successive data stream units of the digital data stream by means of a synchronization bit detection unit;

d) determination of the data clock from a temporal spacing of the successive frame synchronization words of the digital data stream in a data clock determination unit; and e) outputting of the data clock in a manner dependent on the temporal spacing of the successive frame synchronization bits of the digital data stream.

Furthermore, the data stream receiver according to the invention for the reception and processing of a digital data stream essentially has:

i) a data stream reception unit for receiving the digital data stream;

ii) a synchronization bit detection unit for detecting the frame synchronization words of successive data blocks of the digital data stream; and iii) a data clock determination unit for determining a data clock from a temporal spacing of the successive frame synchronization words of the digital data stream.

In accordance with one preferred development of the present invention, the at least one frame synchronization word of a data stream unit comprises K frame synchronization bits, the K frame synchronization bits advantageously preceding the data bits of the data stream unit.

In accordance with a further preferred development of the present invention, a frame start of the at least one data frame is defined by a frame synchronization word when the frame synchronization word is preceded by at least N+K+1 dummy bits.

In accordance with yet another preferred development of the present invention, the N data bits of each data block are preceded by K=2 frame synchronization bits, i.e. a frame synchronization word is represented by two frame synchronization bits.

In accordance with yet another preferred development of the present invention, the useful data to be transmitted are introduced into the N data bits of a data stream unit, which follow the synchronization word of the data stream unit. It is expedient that for a DSL3 format and similar formats, a number of N=32 data bits are provided for the transmission of the useful data.

In accordance with yet another preferred development of the present invention, the at least N+K+1 dummy bits which precede the frame synchronization word are provided as logic ones "1", so that, after a sequence of a number of N+K+1 dummy bits in a synchronization bit detection unit it is possible to ascertain that a frame start is present.

In accordance with yet another preferred development of the present invention, the data block of the first data stream unit of each data frame contains header data which designate one or a plurality of superframe starts.

In accordance with yet another preferred development of the present invention, the header data contain superframe synchronization bits, the superframe synchronization bits designating respective superframe stops.

In accordance with yet another preferred development of the present invention, the superframe synchronization bits contained in the header data in each case indicate a start of an assigned superframe by logic zeros.

The data stream receiver in accordance with one preferred development of the present invention furthermore has a frame detection unit for detecting a frame start. Starts of individual frames can advantageously be defined in this way.

In accordance with yet another preferred development of the present invention, the data stream receiver furthermore has a superframe detection unit for detecting a superframe start. In this way, the start of a superframe, i.e. a superframe start, can advantageously be output from the data stream receiver.

A further preferred development of the present invention provides an interface module with a data stream receiver for data transmission, in which information about a data clock and about at least one data frame of the digital data stream is recovered from the digital data stream itself.

Exemplary embodiments of the invention are illustrated in the drawings and are explained in more detail in the description below. In the drawings:

BRIEF DESCRIPTION OF THE DRAWINGS

FIG. 3 shows a flow diagram for elucidating a reception of the digital data stream and the recovery of the data clock and/or the frame start; and FIG. 4 shows the construction of a data frame according to the invention.

In the figures, identical reference symbols designate identical or functionally identical components or steps.

DETAILED DESCRIPTION

Figure 1:
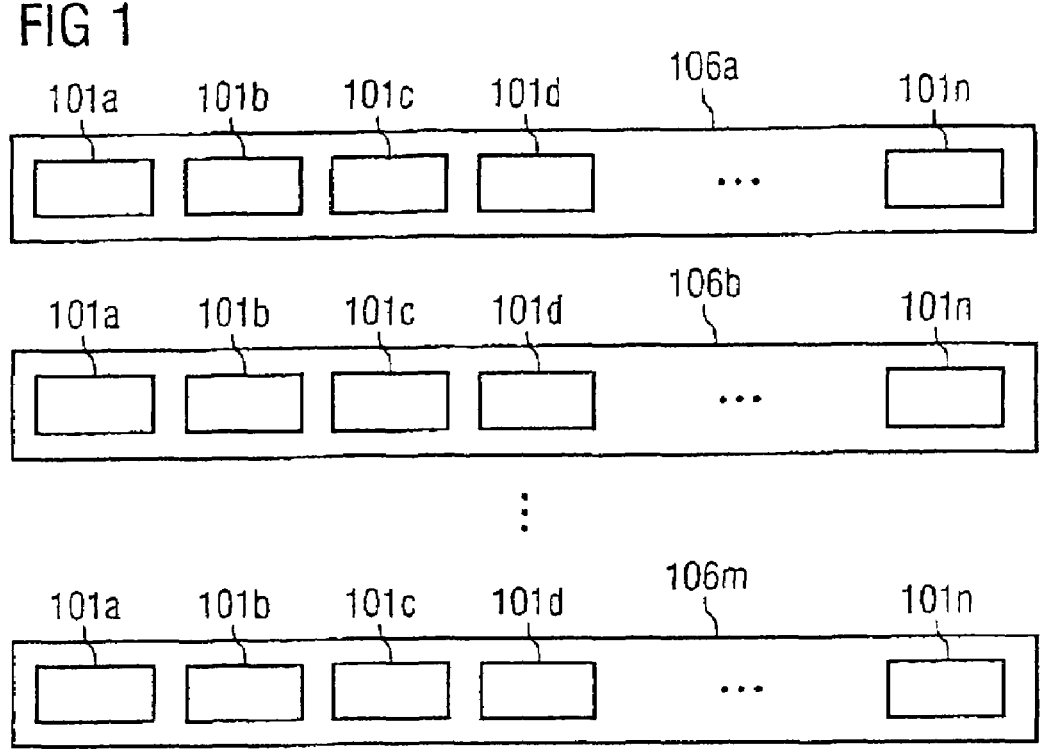
FIG. 1 shows a block diagram illustrating the arrangement of individual data frames 101a-101n in respective superframes 106a-106m.

FIG. 1 shows the basic construction of a digital data stream, the data stream being subdivided into superframes 106a-106n, on the one hand, and data frames 101a-101n, on the other hand. The data frames 101a-101n have a structure as will be described below with reference to FIG. 4. FIG. 1 serves merely as an example for illusterating a possible structure of digital data stream 100, which is received by means of a data stream receiver 200, described below with reference to FIG. 2.

Figure 2:
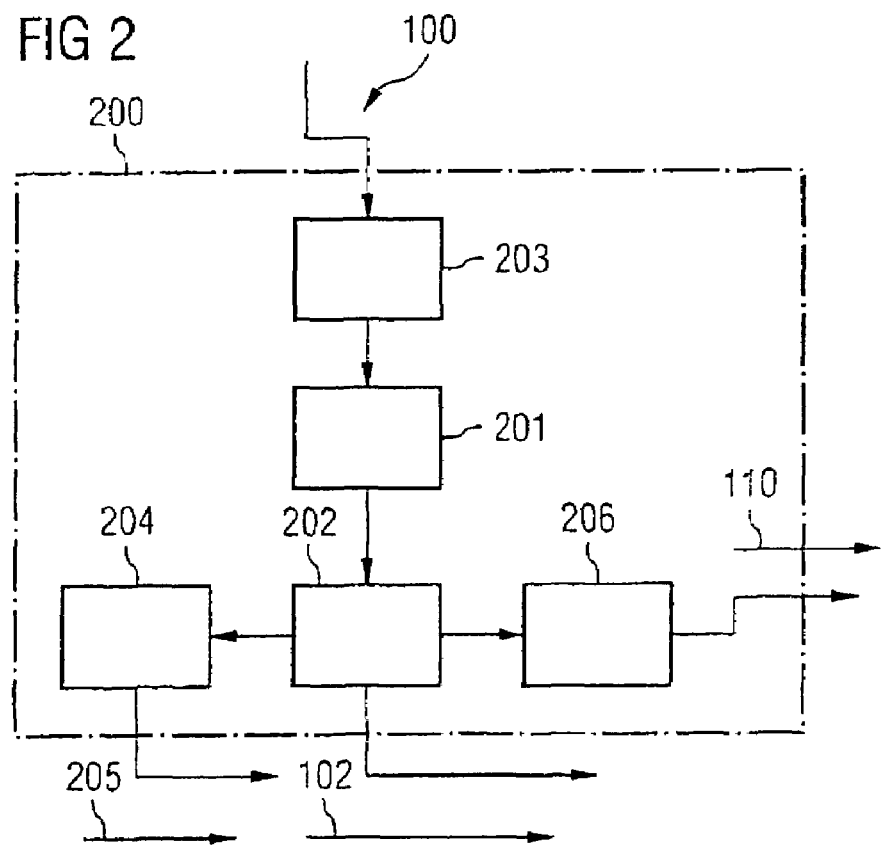
FIG. 2 shows a block diagram of a data stream receiver in accordance with a preferred exemplary embodiment of the present invention.

FIG. 2 shows a data stream receiver 200 for taking up the digital data stream 100, the data stream receiver 200 outputting, on the one hand, a data clock 102 and, on the other hand, information about a superframe start 205 and, respectively, a frame start 110.

Furthermore, even though this is not shown in FIG. 2, it is possible, of course, for the digital data stream 100 itself to be output again, as a result of which the data stream receiver acts as a data stream transmitter. For the explanation of the method according to the invention for the transmission of the digital data stream 100, it suffices to illustrate the generation of the information about the data clock 102, the frame start 110 and/or the superframe start 205. As shown in FIG. 2, the digital data stream 100 is fed into the data stream receiver 200 to a data stream reception unit 203. By way of example, a signal amplification and a data stream analysis, which are not essential for understanding the method according to the invention, are carried out in the data stream reception unit.

The digital data stream conditioned in this way is furthermore fed to a synchronization bit detection unit 201. The synchronization bit detection unit detects frame synchronization words 104, which are contained in each data stream unit 108 in addition to a number of N data bits. Generally, a data block 103 comprises N data bits which contain the useful data. Preferably, the frame synchronization word 104, also see FIG. 4, is constructed from K=two frame synchronization bits. After passing through the synchronization bit detection unit 201, the digital data stream 100 is subsequently fed to a data clock determination unit 202, which determines the data clock using a temporal spacing of the successive frame synchronization words 104 or the successive synchronization bits of the digital data stream 100. A data clock 102 is determined in this way, and is output from the data stream receiver 200.

Furthermore, the data clock determination unit 202 is connected to a frame detection unit 206, which detects a start of a frame, i.e. a frame start 110, by detecting a specified number of dummy bits. In this case, a frame start 110 of the at least one data frame 101 is defined by a frame synchronization word 104 or by synchronization bits in the data stream unit 108 when the frame synchronization word 104 is preceded by at least N+K+1 dummy bits. In the exemplary embodiment according to the invention, the dummy bits are provided as logic ones "1". A frame start 110 detected in this way is finally output from the frame detection unit 206.

Furthermore, the data clock determination unit 202 is connected to a superframe detection unit 204, which defines the start of one or a plurality of superframes 106, 106a-106m in accordance with the method described below with reference to FIG. 4. Information about the start of a superframe, i.e. a superframe start 205, is output from the superframe detection unit 204.

FIG. 4 shows the structure of an individual data frame 101 contained in the digital data stream 100, in accordance with a preferred exemplary embodiment of the present invention. The data frame 101 has a data frame duration 107 defined between a frame start 110 and a frame end 111. The data frame duration 107 is typically 125 µs in a DSL3 format (DSL=digital subscriber line). In the DSL3 format, a data stream unit is composed of frame synchronization word 104, comprising K=two frame synchronization bits, and N=data bits. As described above, the synchronization bits are used for clock recovery, i.e. for providing the data clock 102, while the N=32 remaining bits are data bits, i.e. the N=32 bits contain the useful data. If the data block to be transmitted for a 125 µs data frame 101 is complete, a series of dummy bits are transmitted by means of the digital data stream. In the preferred exemplary embodiment, 35 logic ones follow as dummy bits, and signal that the following synchronization bit 104, K=2, corresponds to a frame start 110.

In this way, the frame detection unit 206 shown in the schematic block diagram of FIG. 2 determines the frame start 110 of a data frame 101. Furthermore, in accordance with the preferred exemplary embodiment of the present invention, it is possible to transmit additional information, since the first N=32 data block 103 of the first data stream unit 108 in a data frame 101 has the function of a "header". Additional data are transmitted in the header, the information about multi-/superframe being provided in the exemplary embodiment explained here. Thus, as illustrated in FIG. 4(*c*), after an occurrence of the synchronization word 104, a first superframe synchronization word 109*a* defines a start of a first superframe 106*a*, a second superframe synchronization word 109*b* defines the start of a second superframe 106*b*, and so on, through to the superframe synchronization word 109*m*, which defines the start of a superframe 106*m*. A superframe start 205, determined in the superframe detection unit 204, shown in FIG. 2, is defined in this way.

In the preferred exemplary embodiment, a number of 2 to 48 data frames 101*a*-101*n* are contained in a superframe 106*a*-106*m*.

FIG. 4(*a*) shows a complete data frame 101 with a data frame duration 107, while FIG. 4(*b*) shows a detail enlargement for illustrating a number of dummy bits provided as logic ones. FIG. 4(*d*) shows in each case a synchronization word 104, the second synchronization word 104 being identified as a frame start 110 of a data frame 101. FIG. 4(*c*) is a further detail enlargement of the detail of the digital data stream 100 as shown in FIG. 4(*b*), the N=32 data block 103 shown in FIG. 4(*c*) being provided as a header which provides the above-described information about one or a plurality of superframe starts 205.

The data stream receiver 200 or data stream transmitter according to the invention exhibits bus capability as a data stream interface. With this interface, different devices can transmit their data in a bit-, byte- or frame-interleaved manner. In this case, the header is used by all the devices, while the useful data are present in the above-described mode on the line and are received by the data stream receiver 200. The detected data clock 102 is delimited by the data block 103 of the header +35 ones as dummy bits with regard to a lower limit, while the upper limit is given only by the technological feasibility.

Although the present invention has been described above using preferred exemplary embodiments, it is not restricted thereto, but rather can be modified in diverse ways.

Moreover, the invention is not restricted to the application possibilities mentioned.

The invention claimed is:

1. A method for transmitting a digital data stream, in which method data clock information and data frame information are recovered from the digital data stream, the method comprising:
   providing a digital data stream having successive data stream units, each data stream unit including
      a data frame,
      a data block having data bits, and
      a frame synchronization word having frame synchronization bits; wherein a frame start of a data frame is defined when a plurality of dummy bits precedes a frame synchronization word, the plurality being at least one greater than the sum of the number of frame synchronization bits in the frame synchronization word and the number of data bits in the data block;
   receiving the digital data stream;
   detecting successive frame synchronization words of the successive data stream units;
   determining the data clock information from a temporal spacing of the successive frame synchronization words; and
   outputting the data clock information in a manner dependent on a temporal spacing of successive frame synchronization bits.

2. The method of claim 1, wherein providing a digital data stream comprises preceding the data bits of the data block by two frame synchronization bits.

3. The method of claim 1, wherein providing a digital data stream comprises encompassing useful data to be transmitted with the data bits of each data block.

4. The method of claim 1, wherein providing a digital data stream comprises providing a 32-bit data block.

5. The method of claim 1, further comprising selecting the dummy bits to be logic ones.

6. The method of claim 1, wherein providing a digital data stream comprises including header data in a first data block of each data frame.

7. The method of claim 6, further comprising including superframe synchronization bits in the header data.

8. The method of claim 7, further comprising including information indicative of the start of an assigned superframe in the superframe synchronization bits, the start being indicated by logic zeroes.

9. A data stream receiver for receiving and processing a digital data stream, the data stream receiver comprising:
   a data stream reception unit for receiving a digital data stream having at least one data stream unit that includes a frame synchronization word having frame synchronization bits and a data block having data bits;
   a synchronization bit detection unit for detecting the frame synchronization wordsof successive data blocks of the digital data stream;
   a data clock determination unit for determining a data clock from a temporal spacing of successive frame synchronization words from the digital data stream; and
   a frame detection unit for detecting a frame start, wherein the frame start of a data frame is defined when a plurality of dummy bits precedes a frame synchronization word, the plurality being at least one greater than the sum of the number of frame synchronization bits in the frame synchronization word and the number of data bits in the data block.

10. The data stream receiver of claim 9, further comprising a superframe detection unit for detecting a superframe start.

11. A manufacture having encoded thereon a digital data stream transmitted by a method for transmitting a digital data stream, in which method data clock information and data frame information are recovered from the digital data stream, the method comprising:
   providing a digital data stream having successive data stream units, each data stream unit including a data frame, a data block having data bits, and a frame synchronization word having frame synchronization bits; wherein a frame start of a data frame is defined when a plurality of dummy bits precedes a frame synchronization word, the plurality being at least one greater than the sum of the number of frame synchronization bits in the frame synchronization word and the number of data bits in the data block;
   receiving the digital data stream;
   detecting successive frame synchronization words of the successive data stream units;

determining the data clock information from a temporal spacing of the successive frame synchronization words; and outputting the data clock information in a manner dependent on a temporal spacing of successive frame synchronization bits.

12. An interface module that includes a data stream receiver for receiving and processing a digital data stream, the data stream receiver comprising:

a data stream reception unit for receiving a digital data stream having at least one data stream unit that includes a frame synchronization word having frame synchronization bits and a data block having data bits;

a synchronization bit detection unit for detecting the frame synchronization words of successive data blocks of the digital data stream; and a data clock determination unit for determining a data clock from a temporal spacing of successive frame synchronization words from the digital data stream; and a frame detection unit for detecting a frame start, wherein the frame start of a data frame is defined when a plurality of dummy bits precedes a frame synchronization word, the plurality being at least one greater than the sum of the number of frame synchronization bits in the frame synchronization word and the number of data bits in the data block.

* * * * *